United States Patent
Northrop et al.

(10) Patent No.: US 10,653,106 B2
(45) Date of Patent: May 19, 2020

(54) COLLAPSIBLE LITTER BOX

(71) Applicant: DOSKOCIL MANUFACTURING COMPANY, INC., Arlington, TX (US)

(72) Inventors: Melaney Northrop, Mansfield, TX (US); Michael Harper, Fort Worth, TX (US); David Veness, Fort Worth, TX (US); Adam Ward Weber, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 400 days.

(21) Appl. No.: 14/273,626

(22) Filed: May 9, 2014

(65) Prior Publication Data
US 2015/0320008 A1 Nov. 12, 2015

Related U.S. Application Data

(60) Provisional application No. 61/821,423, filed on May 9, 2013.

(51) Int. Cl.
*A01K 1/01* (2006.01)
(52) U.S. Cl.
CPC .................. *A01K 1/0125* (2013.01)
(58) Field of Classification Search
CPC .... A01K 1/0107; A01K 1/033; A01K 1/0125; A01K 1/0245; A01K 1/03; A01K 1/035; A01K 29/00; A01K 1/0114; A01K 1/011; A01K 1/0152; A01K 1/0236
USPC .......................................................... 119/165
See application file for complete search history.

(56) References Cited

U.S. PATENT DOCUMENTS

| | | | | |
|---|---|---|---|---|
| 4,111,157 A | * | 9/1978 | Haugen | A01K 1/0107 119/165 |
| 4,348,982 A | * | 9/1982 | Selby | A01K 1/0125 119/168 |
| D308,589 S | * | 6/1990 | Shay | A01K 1/0107 D30/161 |
| 5,065,702 A | * | 11/1991 | Hasiuk | A01K 1/0125 119/168 |
| 5,117,781 A | * | 6/1992 | Roach | A01K 1/0125 119/168 |
| 5,499,610 A | * | 3/1996 | Bruner | A01K 1/0107 119/165 |

(Continued)

*Primary Examiner* — Magdalena Topolski
*Assistant Examiner* — Morgan T Barlow
(74) *Attorney, Agent, or Firm* — Global IP Counselors, LLP

(57) ABSTRACT

A litter box includes upper and lower shells having corrugations formed therein that strengthen the walls of the shell and that enable the walls themselves to be relatively thinner than would be required in the absence of corrugations. The relatively thinner walls thus enable the litter box to be formed from less material. The corrugations are configured to enable molding with conventional two-part molds. An upper shell portion has a handle integrally molded therein. When assembled, the upper shell sits atop the lower shell, and the line of junction between the upper and lower shells is oriented oblique to a bottom surface of the lower shell and thus oblique to a floor upon which the litter box may sit. The oblique angle enables a relatively low step-over height at the front and a relatively high height at the rear to resist the penetration of urine.

15 Claims, 9 Drawing Sheets

(56) References Cited

U.S. PATENT DOCUMENTS

| | | | | |
|---|---|---|---|---|
| 5,655,478 | A * | 8/1997 | Kiera | A01K 1/0107 119/165 |
| 6,223,688 | B1 * | 5/2001 | Engel | A01K 1/0107 119/165 |
| 6,371,048 | B1 * | 4/2002 | Smith | A01K 1/0114 119/166 |
| 7,017,519 | B1 * | 3/2006 | Deasy | A01K 1/011 119/166 |
| 8,181,601 | B2 * | 5/2012 | Kratzer | A01K 1/0107 119/161 |
| 8,613,259 | B1 * | 12/2013 | Pharo | A01K 1/0107 119/163 |
| 2005/0183672 | A1 * | 8/2005 | Lewis, II | A01K 1/0107 119/165 |
| 2006/0005777 | A1 * | 1/2006 | Galindo | A01K 1/0107 119/165 |
| 2008/0022938 | A1 * | 1/2008 | Callan | A01K 1/0107 119/165 |
| 2009/0223461 | A1 * | 9/2009 | Trunnell | A01K 1/0245 119/472 |
| 2009/0272327 | A1 * | 11/2009 | Plante | A01K 1/0107 119/168 |
| 2010/0282175 | A1 * | 11/2010 | Bjornson | A01K 1/0125 119/168 |
| 2011/0297096 | A1 * | 12/2011 | Northrop | A01K 1/0107 119/165 |
| 2015/0114303 | A1 * | 4/2015 | Shamir | A01K 1/0114 119/166 |

* cited by examiner

COLLAPSIBLE LITTER BOX

CROSS-REFERENCE TO RELATED APPLICATION

The instant application claims priority from U.S. Provisional Patent Application Ser. No. 61/821,423 filed May 9, 2013, the disclosures of which are incorporated herein by reference.

BACKGROUND

Field

The disclosed and claimed concept relates generally to pet care products and, more particularly, to a litter box.

Related Art

Numerous types of pet care devices are well known in the relevant art, Among such devices are litter boxes that contain an amount of clay-based or other type of cat litter that a cat uses for elimination.

While such known litter boxes have been generally effective for their intended purposes, they have not been without limitation. Due to the complex shapes possessed by most known litter boxes, the tooling that is required in order to injection mold such litter boxes has been expensive. Additionally, the overall cost of materials to manufacture such known litter boxes has likewise been expensive. Improvements thus would be desirable.

SUMMARY

An improved litter box includes upper and lower shells having corrugations formed therein that strengthen the walls of the shell and that enable the walls themselves to be relatively thinner than would otherwise be required in the absence of such corrugations. The relatively thinner walls thus enable the litter box to be formed from less raw material. The corrugations are configured to enable molding, with conventional two-part molds. An upper shell portion has a handle integrally molded therein and still enables molding with conventional two-part injection molds. The upper shell sits atop the lower shell when the litter box is in an assembled configuration, and the line of junction between the upper and lower shells is oriented oblique to a bottom surface of the lower shell and thus oblique to a floor upon which the litter box may sit. The oblique angle enables a relatively low step-over height at the front and a relatively high height at the rear to resist the penetration of urine.

Accordingly, an aspect of the disclosed and claimed concept is to provide an improved litter box having, reduced cost.

Another aspect of the disclosed and claimed concept is to provide an improved litter box having enhanced functionality.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
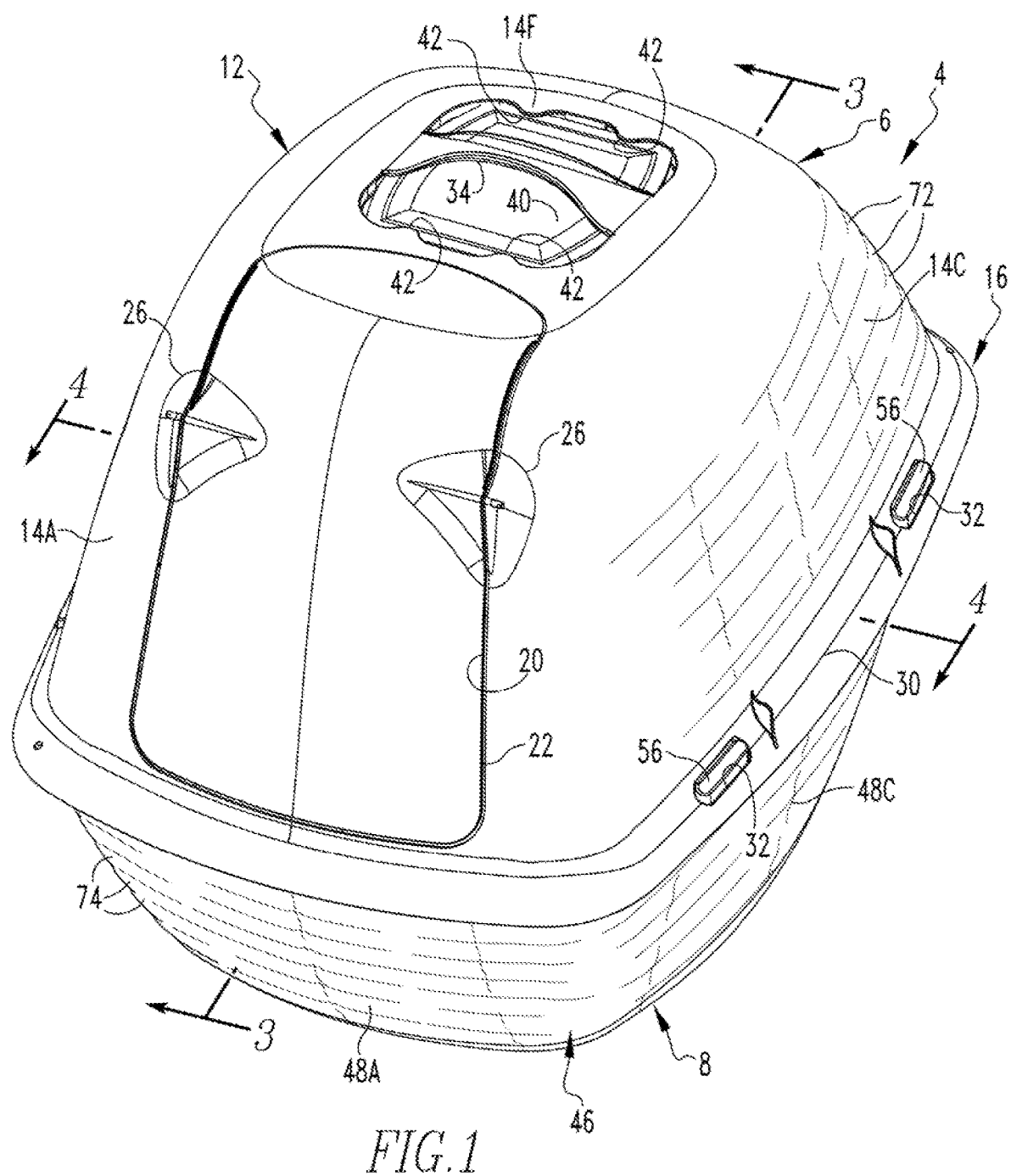
FIG. 1 is a frontal perspective view of an improved litter box in accordance with the disclosed and claimed concept in an assembled configuration.

An improved litter box 4 in accordance with the disclosed and claimed concept is depicted generally in FIGS. 1-9. The litter box 4 has an upper portion 6 and a lower portion 8 which, when assembled together in the fashion depicted in FIGS. 1 and 2, includes an interior region 10 that is depicted generally in FIGS. 3 and 4. As is generally understood, the litter box 4 is configured to receive a quantity of cat litter or other appropriate material within the interior region 10, and such cat litter is situated generally upon lower portion 8 to enable elimination by cats.

The upper portion 6 can be said to include an upper shell 12 having a front side 14A, a left side 14B, a right side 14C, a rear side 14D, and a top 14F. The upper portion 6 further includes an upper connection portion 16 that extends substantially about the perimeter of the upper shell 12 and that is connectable with the lower portion 8. The upper shell 12 has an upper cavity portion 18 generally within the interior thereof.

The upper shell 12 has a doorway 20 formed therein and includes a door 22 that is generally situated within the doorway 20. In the depicted exemplary embodiment, an adhesive label 24 (FIG. 5) is adhesively connected with the door 22, extends beyond the edges of the door 22, and is further adhesively connected with portions of the upper shell 12 on the front side 14A that are adjacent the doorway 20. The door 22 is pivotably mounted to a pair of lugs 26 situated on alternate sides of the doorway 20. When the label 24 has been removed from the upper portion 16, the door 22 is freely pivotable within the doorway 20. Prior to removal of the label 24, however, the label 24 serves to retain the door 22 in a fixed position within the doorway 20 and to further secure the door 22 to the upper shell 12. This facilitates shipping of the litter box 4 and displaying the litter box 4 at a point of sale. By providing the label 24 to extend between the door 22 and the upper shell 12, it is possible to eliminate employing in addition to a promotional label adhesive tape or other connection methodologies to retain the door 22 in a fixed position with respect to the upper shell 12, such as would be required prior to sale. The elimination of such additional adhesive tape reduces expense.

Figure 3:
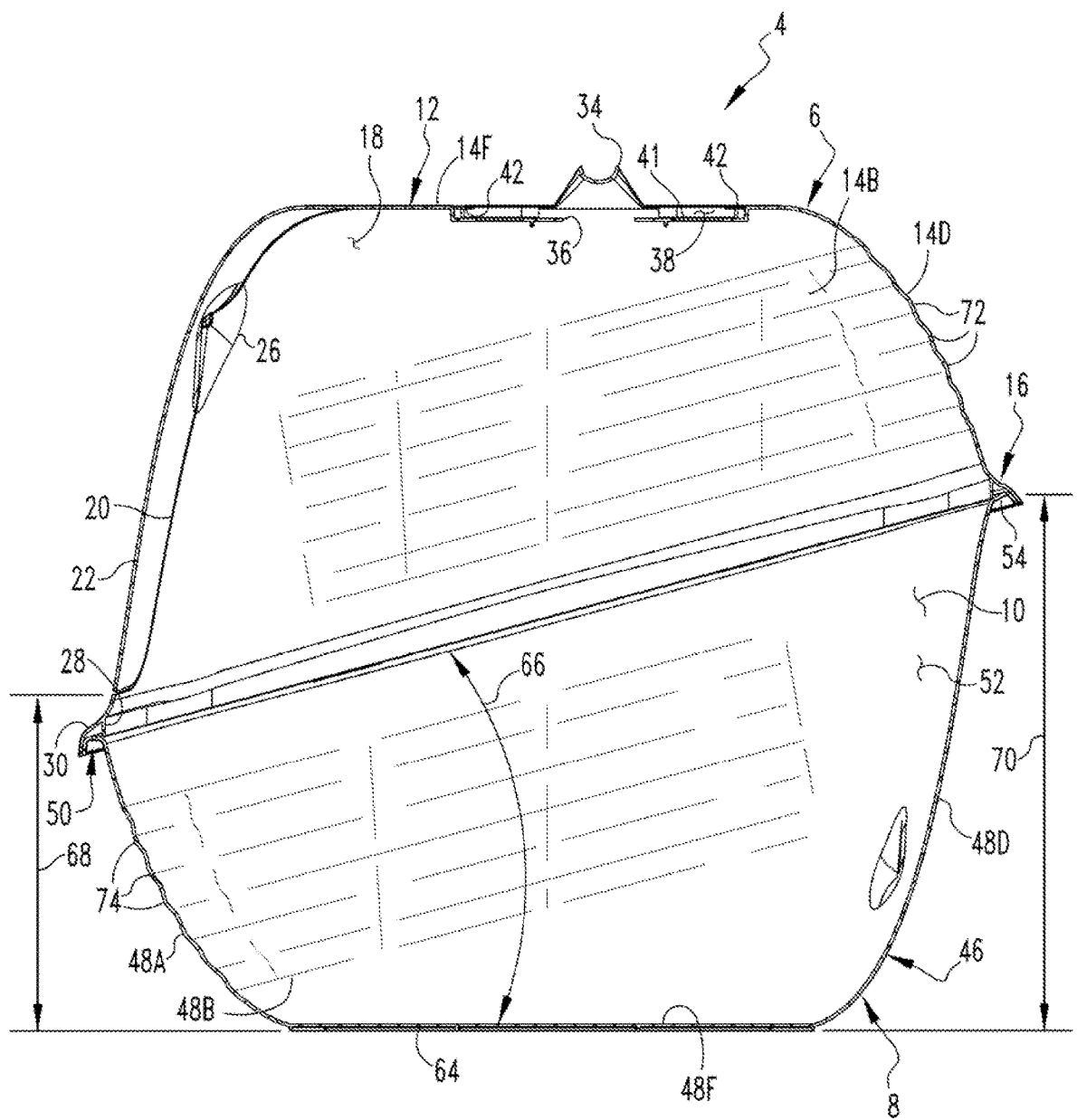
FIG. 3 is a sectional view as taken along line 3-3 of FIG. 1.
Figure 4:
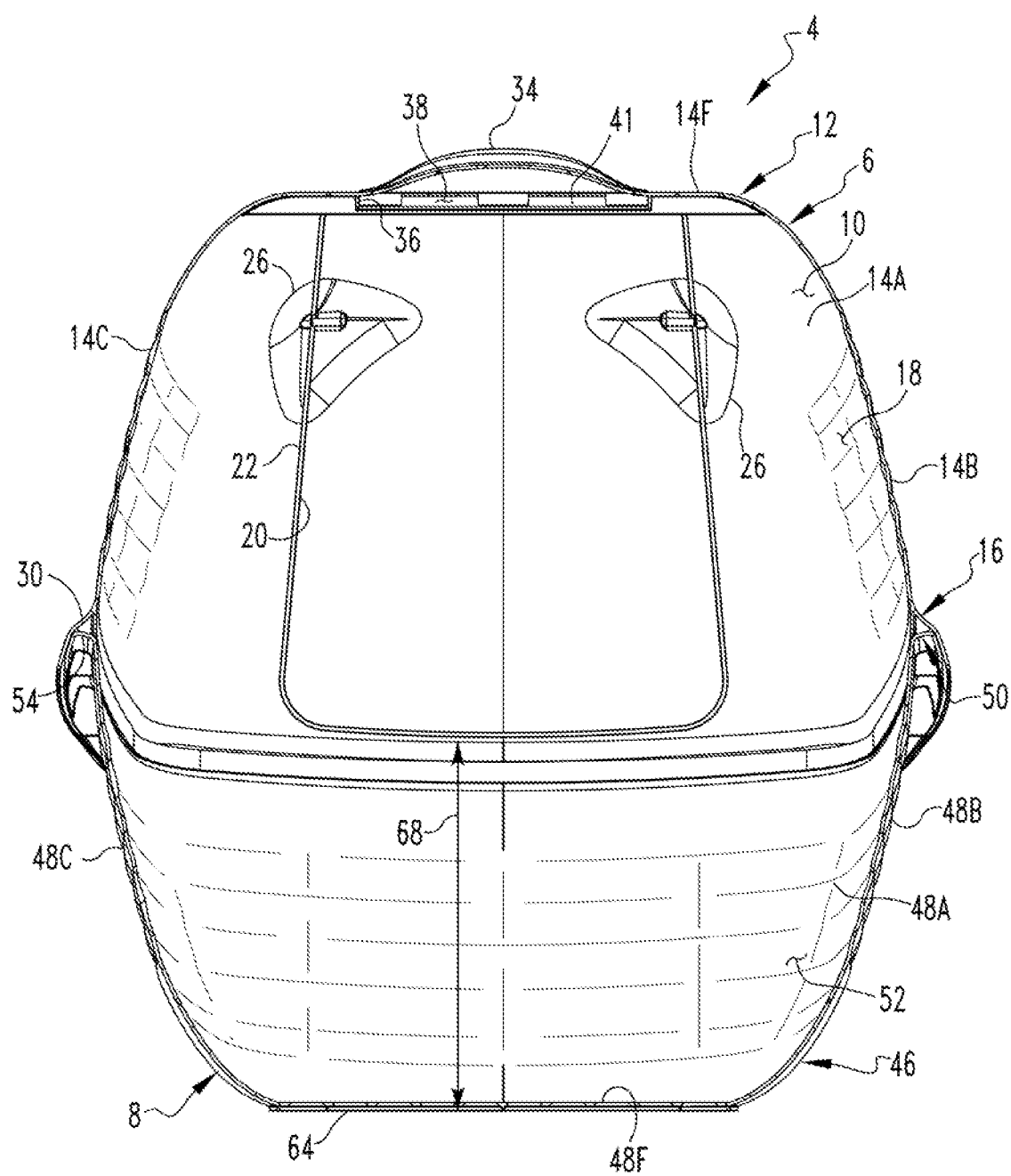
FIG. 4 is a sectional view as taken along line 4-4 of FIG. 1.
Figure 7:
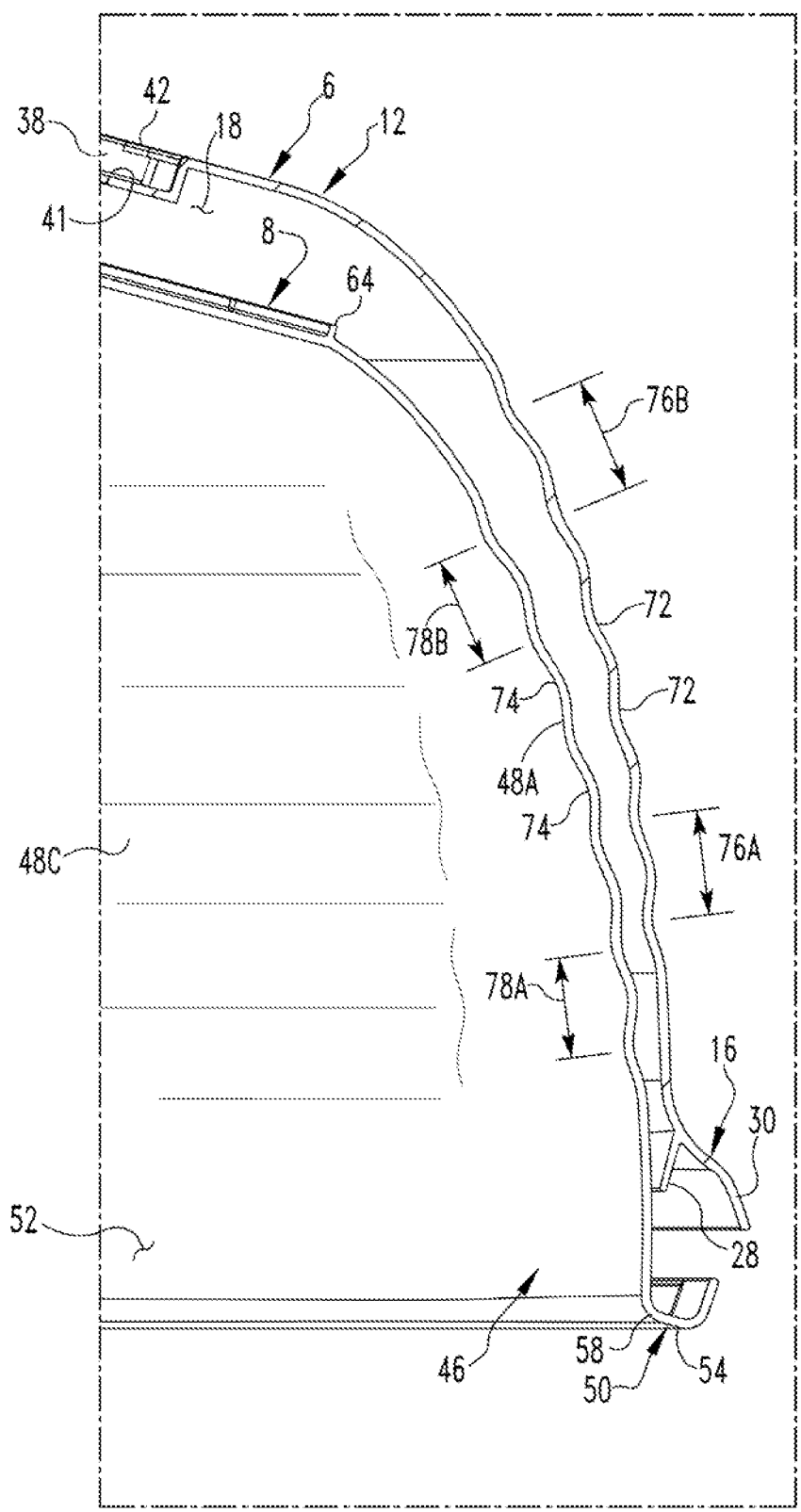
FIG. 7 is an enlarged view of an indicated portion of FIG. 6.
Figure 8:
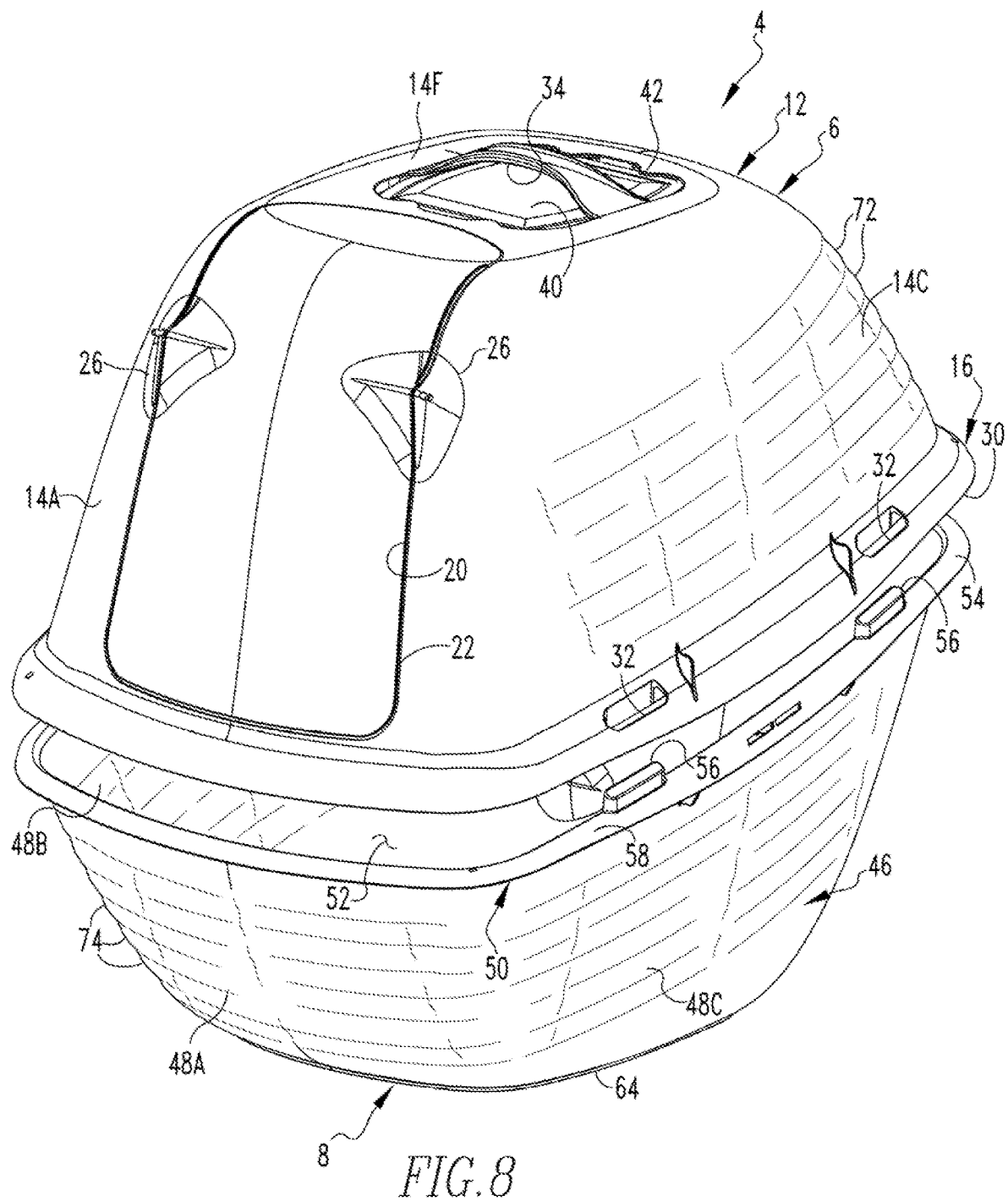
FIG. 8 is an exploded view of the litter box of FIG. 1.
Figure 9:
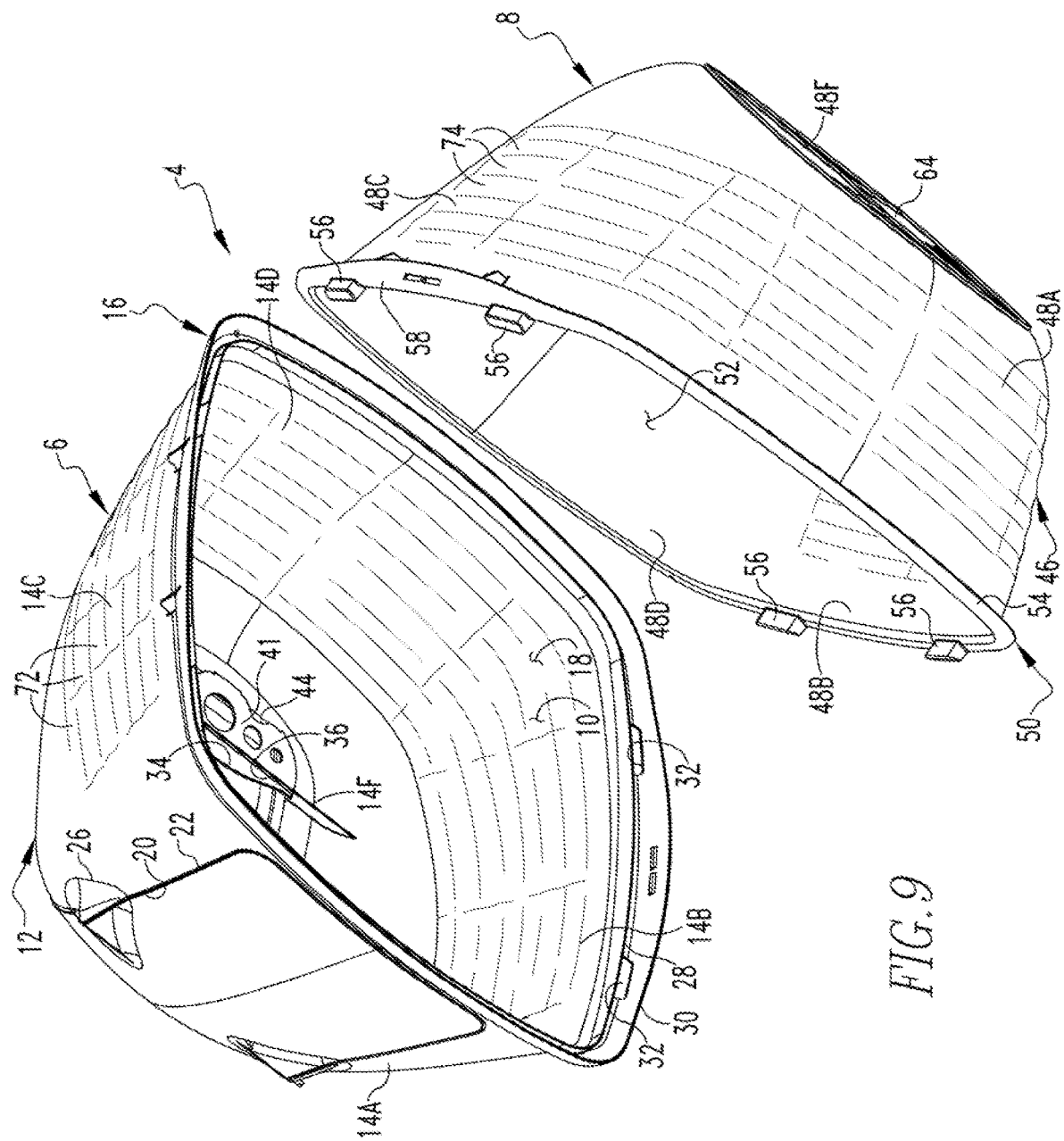
FIG. 9 is another exploded view of the litter box of FIG. 1.

As can be seen in FIGS. 3, 4, and 7, by way of example, the upper connection portion 16 in the depicted exemplary embodiment includes an inboard lip 28 and an outboard lip 30 that engage the lower portion 8 and that retain the upper portion 6 securely upon the lower portion 8. The outboard lip 30 has a set of holes 32 formed therein that are cooperable with other structures that are formed on the lower portion 8, as will be set forth in greater detail below.

Figure 5:
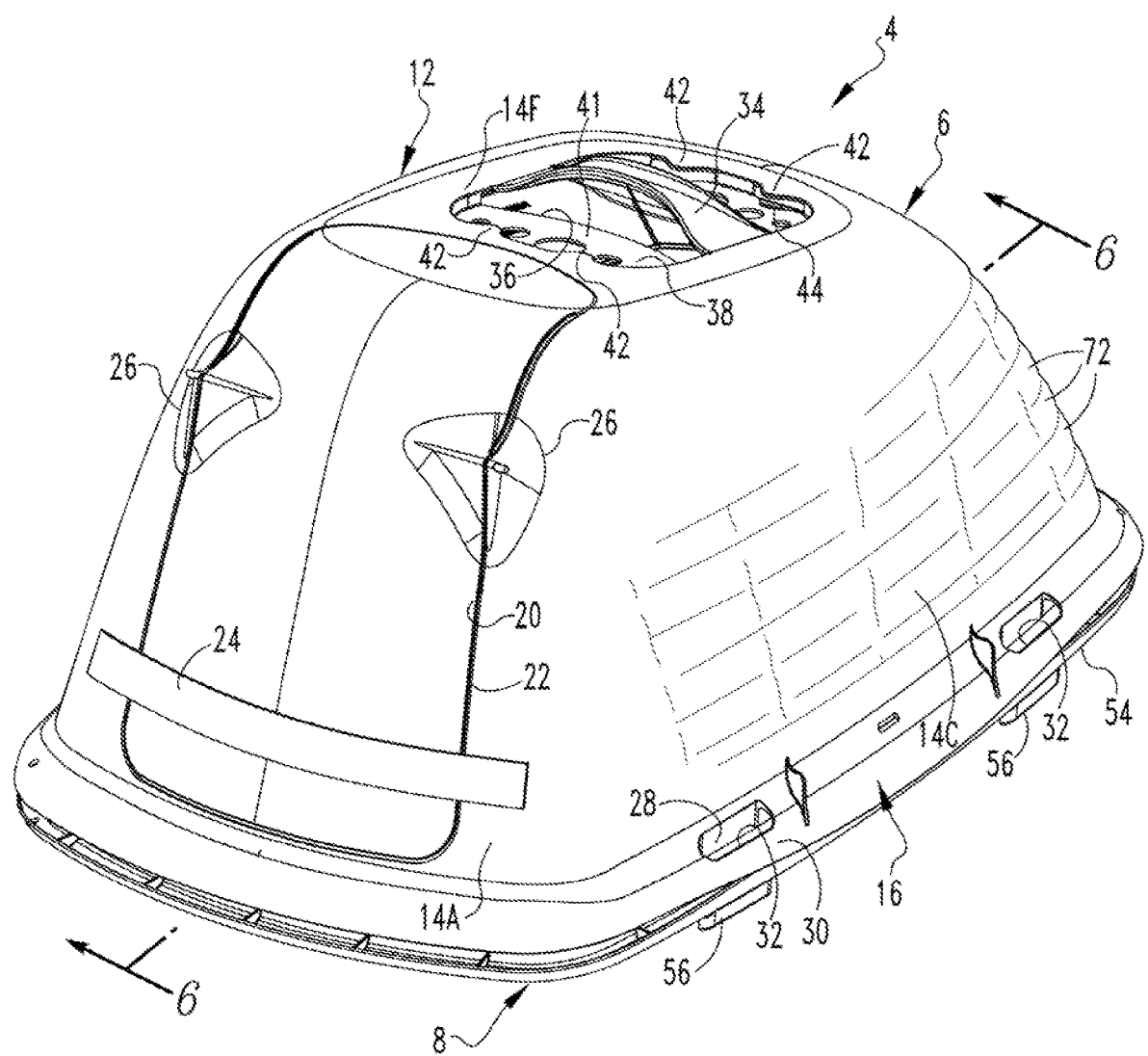
FIG. 5 is a perspective view of the litter box of FIG. 1 in a collapsed configuration.

The upper shell 12 has a handle 34 integrally formed therewith. The upper shell 12 further has a base portion 41 adjacent the handle 34, with the base portion 41 having an opening 36 formed therein that is situated generally between the handle 34 and the upper cavity portion 18. The opening 36 extends the entire length and width of the handle 34 and generally corresponds with the shape of the handle 34, as can be understood generally from FIG. 5. The upper shell 12 includes a plurality of tabs 42 that are protuberant and that are spaced from the base portion 41. As can further be understood from FIG. 5, the upper shell 12 has a receptacle 38 formed therein in the vicinity of the handle 34 and situated generally between the base portion 41 and the tabs 42. The receptacle 38 receives therein a filtration element 40, as is depicted in FIG. 1. It is noted that FIG. 5 depicts the filtration element 40 having been removed from the receptacle 38 or not yet inserted therein prior to sale. The tabs 42 retain the filtration element 40 in the receptacle 38. It can be understood from Fig, 9 that the base portion 41 of the receptacle 38 has a plurality of apertures 44 formed therein that are each situated generally adjacent one of the tabs 42.

It can be understood, therefore, that by providing the opening 36 adjacent the handle 34, the upper portion 6 can be injection molded using conventional two-piece molds which enable the handle 34 to be integrally formed, i.e., co-formed, with the other portions of the upper shell 12, which reduces cost. Likewise, the apertures 44 that are formed in the base portion 41 are situated generally between the tabs 42 and the upper cavity portion 18 which likewise enables the upper portion 6 to be injection molded using conventional two-piece molds while still permitting the protuberant tabs 42 to be integrally formed, i.e., co-formed, with the other portions of the upper shell 12, likewise saving cost.

Figure 6:
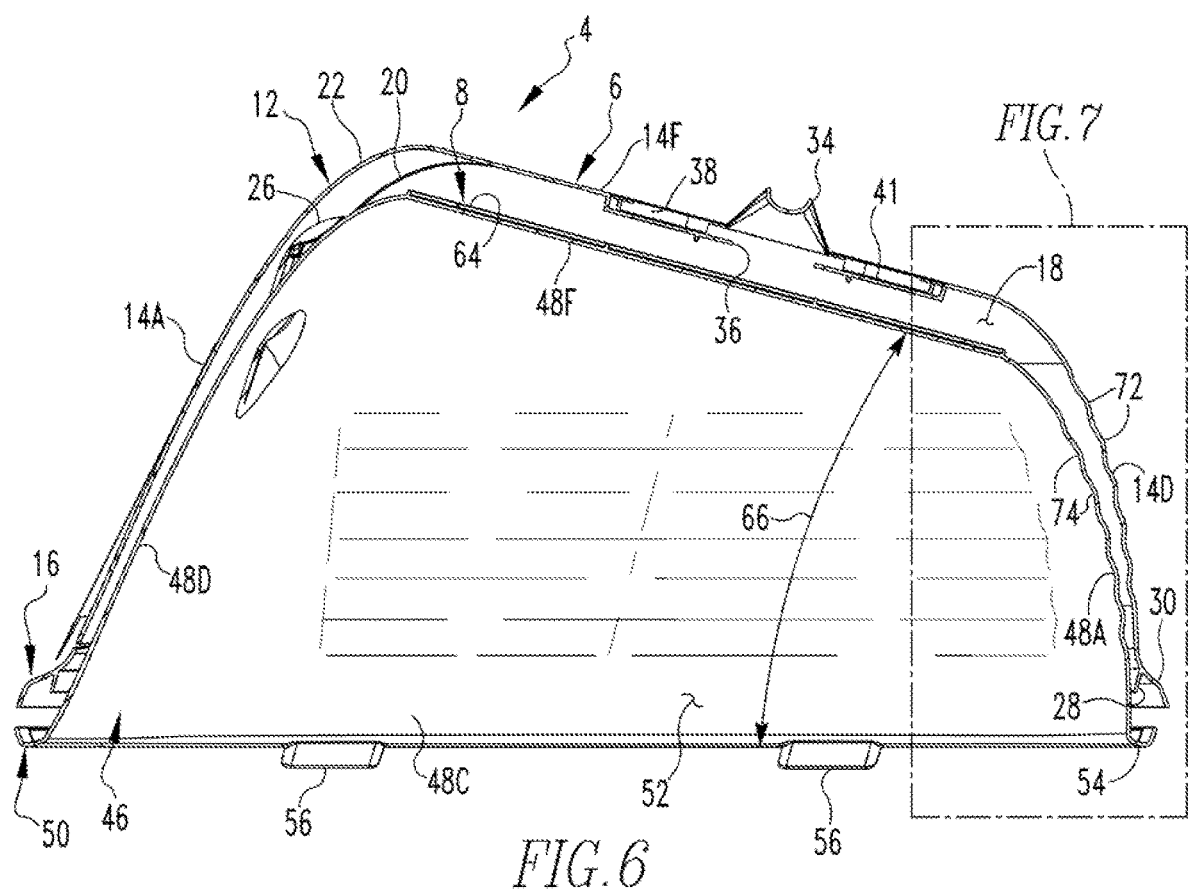
FIG. 6 is a sectional view as taken along line 6-6 of FIG. 5.

The lower portion 8 can be said to include a lower shell 46 having a front side 48A, a left side 48B, a right side 48C, a rear side 48D, and a bottom 48F. The lower portion 8 further includes a lower connection portion 50 that extends generally about a perimeter of the lower shell 46. The lower shell 46 has a lower cavity portion 52 situated generally in the interior region thereof. As can be seen in FIGS. 3, 4, and 6, for instance, the lower connection portion 50 can be seen to include a support 54 which, in the depicted exemplary embodiment, is in the form of a lip that protrudes in an outboard direction from the lower shell 46 and which is of an at least partially arcuate cross section. A plurality of bosses 56 protrude from an engagement surface 58 of the support 54 and are receivable in the holes 32 when the upper portion 6 is received atop the lower portion 8, as is depicted generally in FIGS. 1-4. In such a situation, the upper connection portion 16 is engaged with and is connected with the lower connection portion 50 via gravity. When the upper and lower connection portions 16 and 50 are engaged with one another, the inboard lip 28 engages an inboard edge of the support 54, and the outboard lip 30 engages an outboard edge of the support 54. A portion of the support 54 is thus situated generally between the free ends of the inboard and outboard lips 28 and 30 when the upper portion 6 is installed upon the lower portion 8.

Figure 2:
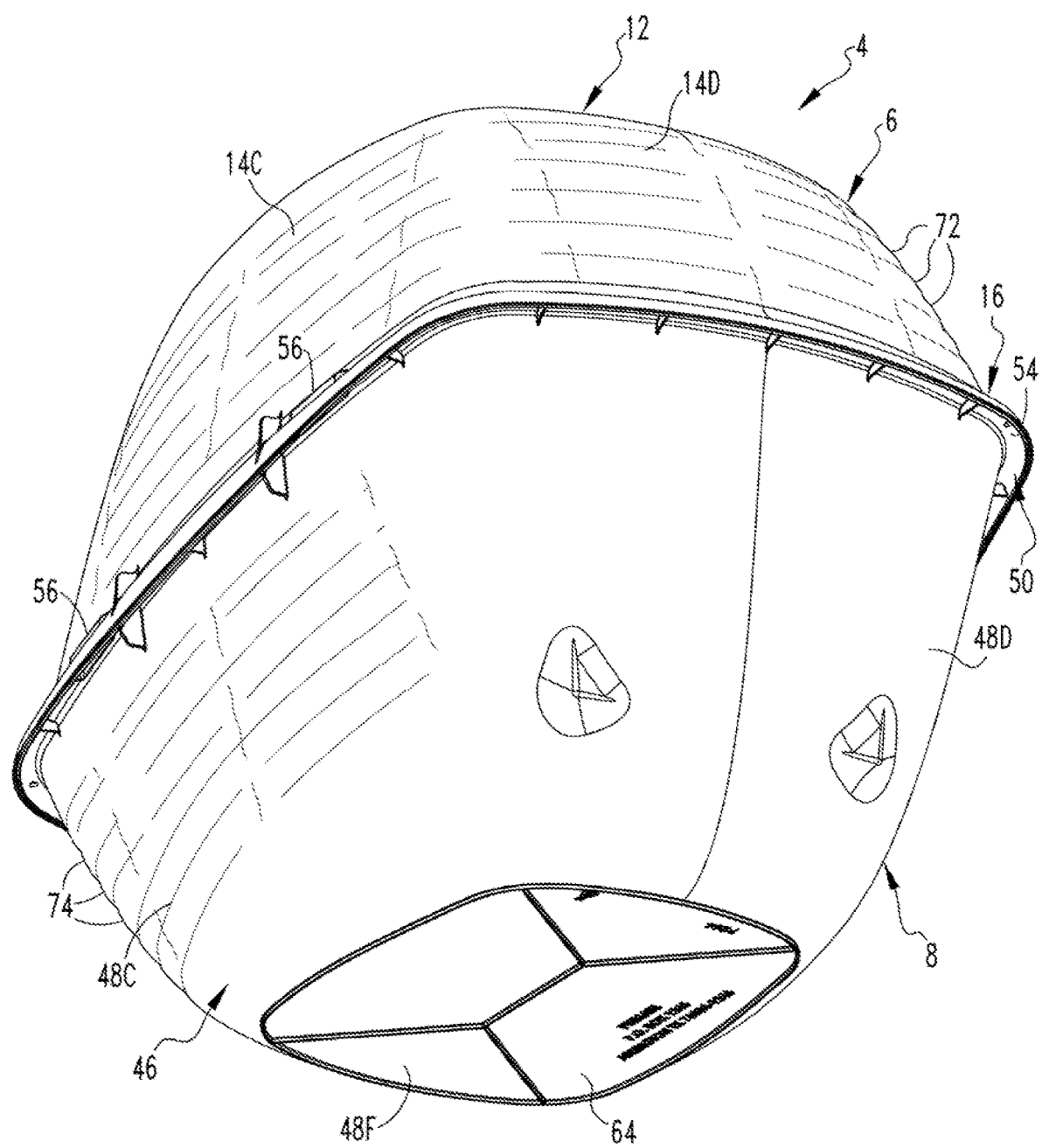
FIG. 2 is a rear perspective view of the litter box of FIG. 1.

As can be seen in FIG. 2, the bottom 48F of the lower shell 46 has a bottom surface 64 that is opposite the lower cavity portion 52 and that is receivable against another structure, such as a floor. As can be understood from FIG. 3, the bottom surface 64 and the lower connection portion 50 are oriented generally oblique to one another as is indicated at the numeral 66. As employed herein, the expression "oblique" and variations thereof shall refer generally to a relative orientation that is neither parallel nor perpendicular. The oblique orientation between the upper and lower portions 6 and 8 provides a number of benefits. As employed herein, the expression "a number of" refers to any non-zero quantity, including a quantity of one.

For instance, the lower portion 8 has a frontal height 68 as measured vertically from the perspective of FIGS. 3 and 4 between the bottom surface 64 and a lower edge of the doorway 20. The frontal height 68 provides a relatively short overstep for an animal to enter and exit the interior region 10 through the doorway 20, which advantageously facilitates older cats continuing to use the litter box 4 for elimination. Moreover, the lower portion 8 has a rear height 70 as measured in the vertical direction from the perspective of FIG. 3 between the bottom surface 64 and the engagement surface 58 that is relatively high and is greater than the frontal height 68. Such an increased rear height 70 avoids leakage of urine between the upper and lower portions 6 and 8 by raising the point at which the upper and lower portions 6 and 8 engage one another to a location generally above where urine from a cat is expected to impinge on the litter box 4 from within the interior region 10.

As can be understood from FIGS. 1 and 3, for example, it can be seen that the door 22 and the doorway 20 extend across the front side 14A and extends at least partially along the top 14F of the upper shell 12 in the vicinity near the receptacle 38. Having the relatively lower overstep afforded by the relatively low frontal height 68 is highly desirable, but in order to take advantage of such a lower overstep, the door 22 must be relatively long. However, by providing an upper portion of the door that is situated vertically above the lugs 26 about which the door 22 freely pivots, the door 22 can be balanced so that it remains situated substantially entirely within the doorway 20 when the bottom surface 64 is situated on a horizontal floor or other support. By configuring the door 22 in such a fashion, the door 22 remains in a generally closed condition situated within the doorway 20, which serves to trap fumes within the interior region 10, which is desirable.

As can further be seen in FIGS. 1 and 2, the upper and lower shells 12 and 46 are corrugated. More particularly, the upper shell 12 has a plurality of upper corrugations 72 formed therein that extend generally parallel with the upper connection portion 16 along the left, rear, and right, and sides 14B, 14D, and 14C, respectively, of the upper shell 12. The lower shell 46 has formed therein a plurality of lower corrugations 74 that are oriented generally parallel with the lower connection portion 50 and that extend along the left, front, and right sides 48B, 48A, and 48C, respectively, of the lower shell 46.

The upper and lower corrugations 72 and 74 are visually attractive and serve as stiffening structures that enhance the stiffness of the upper and lower shells 12 and 46 by increasing their area moments of inertia (in a cross-sectional direction). By increasing the stillness of the upper and lower shells 12 and 46, the upper and lower shells 12 and 46 can advantageously have a wall thickness that is relatively thinner than would otherwise be required in the absence of the corrugations 72 and 74. Such relatively thinner walls in the upper and lower shells 12 and 46 permits the upper and lower portions 6 and 8 to be formed from relatively less raw material than would otherwise be required in the absence of the upper and lower corrugations 72 and 74. Reduced material consumption results in reduced unit cost and reduced shipping, cost, both of which are desirable.

As can be understood from FIGS. 3-4 and 6-7, the upper and lower corrugations 72 and 74 are generally each of a varying radius and are each oriented with respect to one another in such a fashion that the upper and lower portions 6 and 8 can be injection molded from conventional two-part molds. In this regard, and as is best shown in FIG. 4, each successive upper corrugation 72, when considered in a progressive direction generally away from the upper connection portion 16, is progressively situated in a generally more inboard position than generally each other upper corrugation 72 that is situated relatively closer to the upper connection portion 16. As can likewise be seen in FIG. 4, the lower corrugations 74 likewise are progressively disposed in a relatively more inboard direction than each such lower corrugation 74 that is situated relatively closer to the lower connection portion 50.

Such successive positioning of the upper and lower corrugations 72 and 74 enables the use of conventional two-part injection molds to form the upper and lower portions 6 and 8 since the upper corrugations are positioned relative to one another such that they do not interfere with the removal of a mold after the upper portion 6 has been injection molded. The same can be said of the way the lower corrugations 74 are positioned relative to one another such that they likewise to not interfere with the removal of a mold therefrom. This is advantageous because it reduces the cost of tooling that is needed to form the upper and lower portions 6 and 8 through injection molding by requiring only two-part molds, as opposed to three- or four-part molds, by way of example.

As can be understood from FIG. 7, the upper corrugations 72 are of different corrugation lengths in a direction that is parallel with the plane of the page of FIG. 7. Such corrugation length is a direction transverse to the direction of elongation of the upper corrugations 72 as they extend about the left, rear, and right sides 14B, 14D, 14C, respectively, of the upper shell 12. The same can be said of the lower corrugations 74. In general terms, the corrugations increase in corrugation length, i.e., undulation length, when moving in a direction generally away from the upper and lower connection portions 16 and 50. For instance, one of the upper corrugations 72 that is relatively proximate the upper connection portion 16 has a proximate transverse dimension that is indicated generally at the numeral 76A, whereas another upper corrugation 72 that is situated relatively distal to the upper connection portion 16 has a distal transverse dimension that is indicated generally at the numeral 76B. It can be seen that the distal transverse dimension 76B is relatively greater than the proximate transverse dimension 76A.

The same can be said of the lower corrugations 74 that are relatively proximate or distal the lower connection portion 50. For example, a relatively more proximate lower corrugation 74 has a proximate transverse dimension 78A, whereas another corrugation 74 that is relatively more distal from the lower connection portion 50 has a distal transverse dimension that is indicated generally at the numeral 78B. The distal transverse dimension 78B is relatively greater than the proximate transverse dimension 78A.

The relatively shorter corrugation lengths proximate the upper and lower connection portions 16 and 50 result in a greater occurrence or density of corrugations proximate the upper and lower connection portions 16 and 50. Such an increase in the number of corrugations advantageously increase the stiffness of the upper and lower shells 12 and 46, respectively, in the vicinity of the upper and lower connection portion 16 and 50, which is desirable. That is, since the bottom 48F is a solid and planar structure, it is generally stiffer than, for instance, the lower connection portion 50 which is adjacent a large opening at the edge of the lower cavity portion 52. As such, relatively less strength and stiffness is needed from the lower corrugations 74 that are relatively closer to the bottom 48F than are needed from the lower corrugations 74 in the vicinity of the lower connection portion 50. The same can be said with regard to the upper corrugations 72 that need to impart relatively greater stiffness in the vicinity of the upper connection portion 16 than is required in the vicinity of the top 14F. The relatively longer distal transverse dimensions 76B and 78B signify an optimization of the dimensions of the various corrugations 72 and 74, i.e., relatively longer corrugations lengths in vicinities where relatively less stiffness is required, which further reduces the consumption of raw material in molding the upper and lower portions 6 and 8, with consequent cost savings.

In use, it can be seen that the litter box 4 is movable between a collapsed configuration, such as is depicted generally in FIGS. 5 and 6, and an assembled configuration, such as is depicted generally in FIGS. 1-4. In the collapsed configuration of FIGS. 5 and 6, the upper and lower portions 6 and 8 are generally nested together, meaning that the lower shell 46 is generally received in the upper cavity portion 18, thereby reducing the overall space that is occupied by the litter box 4 in the collapsed position. Moreover, the lower cavity portion 52 in the collapsed configuration can receive therein an upper shell 12 of another identical litter box 4 in the collapsed configuration that is not expressly depicted herein. As such, a plurality of litter boxes 4 in the collapsed configuration of FIGS. 5 and 6 can be stacked one upon another to further reduce the space occupied by the litter box 4 in the collapsed configuration. Reduced space requirements for shipping, and at the point of sale further reduce costs, which is desirable.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A litter box comprising:
   a first shell portion that is a top shell having a first connection portion, a handle, a first cavity portion and having a doorway formed therein to permit ingress and egress of an animal, a top surface of the first shell portion having a filter receptacle that receives a filter, the handle protruding from the top surface of the first shell portion such that the handle is fixedly positioned directly over the filter receptacle, the receptacle having an opening formed on the first shell underneath the top surface between the handle and the first cavity portion, the opening being directly below the handle and extending the entire width and length of the handle, the shape of the opening being substantially the same as the shape of the handle to enable the first shell portion to be injection molded with the handle integrally formed with the top surface of the first shell portion;
   a second shell portion having a second connection portion and a second cavity portion, the second shell portion being a bottom shell of the litter box, the second connection portion having a support, the first and second shell portions being movable between a first configuration and a second configuration, in the first configuration, the second shell portion being nested within the first cavity portion and in the second configuration, the first connection portion being engaged with the support of the second shell portion such that the first shell portion is disposed on top of the second shell portion.

2. The litter box of claim 1, wherein
the second connection portion is configured to connect with the first connection portion of the first shell portion, the second shell portion has a bottom surface that is structured to rest upon a floor, the bottom surface and the second connection portion being oriented oblique to one another, in the second configuration, the first connection portion is engaged with the support of the second connection portion and is disposed on top of the second shell portion so that the first and second cavity portions define an interior region of the litter box, the first connection portion and the second connection portion being oblique with the bottom surface of the second shell portion.

3. The litter box of claim 2, wherein
in the second configuration, the second shell portion has a frontal height adjacent the doorway defined by a distance between the bottom surface and the second connection portion, the second shell portion further having a rear height opposite the frontal height defined by a distance between the bottom surface and the second connection portion, the frontal height being less than the rear height.

4. The litter box of claim 3, wherein
the first shell portion further comprises a door that is pivotably situated on the first shell portion and disposed in the doorway, the door having a first portion and a second portion oriented non-parallel with one another, the first and second portions being flush with adjacent regions of the first shell portion when the door is in a freely pivotable state and when the litter box is situated in the second configuration on a horizontal surface.

5. The litter box of claim 3, wherein
the first shell portion further comprises a door and a label, the door being pivotably situated on the first shell portion and being disposed in the doorway, the label being adhesively situated on the door, the label extending beyond at least a first edge of the door and being adhesively connected with the first shell portion.

6. The litter box of claim 5, wherein
the label is adhesively connected with the first shell portion at two locations situated at opposite sides of the door.

7. The litter box of claim 2, wherein
the first shell portion has a plurality of first holes and a plurality of first bosses situated adjacent the first connection portion, and the second shell portion has a plurality of second holes and a plurality of second bosses situated adjacent the second connection portion, the plurality of first bosses being received in the plurality of second holes and the plurality of second bosses being received in the plurality of first holes in the second configuration of the litter box.

8. The litter box of claim 1, wherein
the opening extends the length and width of the handle.

9. The litter box of claim 1, wherein
the first shell portion has a first corrugated section that is disposed on a first side surface of the first shell portion, the second shell portion has a second corrugated section that is disposed a second side surface of the second shell portion that is on the opposite side of the first side surface when the litter box is in the second configuration.

10. The litter box of claim 9, wherein
the first shell portion further comprises a door pivotably situated in the doorway, the front side of the first shell portion being free of corrugations, the first portion further having an adhesive label that extends between the door and the first shell portion.

11. The litter box of claim 9, wherein
the first and second corrugated sections are each of an arcuate profile of varying radius.

12. The litter box of claim 9, wherein
the first and second corrugated sections are oriented to enable formation of each of the first shell portion and the second shell portion using two-part mold techniques.

13. The litter box of claim 9, wherein
first and second corrugated sections extend along a direction oriented parallel with or oblique to the first and second connection portions.

14. The litter box of claim 13, wherein
on the first shell portion, each corrugation is situated in a more inboard position than each other corrugation that is situated relatively closer to the first connection portion.

15. The litter box of claim 13, wherein
on the first shell portion, at least some of the corrugations each have a transverse dimension which is transverse to the direction of elongation that is relatively larger than the transverse dimension of at least one other corrugation that is situated relatively closer to the first connection portion.

* * * * *